(12) United States Patent
Sakumoto et al.

(10) Patent No.: US 9,123,194 B2
(45) Date of Patent: Sep. 1, 2015

(54) PRINT MEDIUM, CARD CREATION METHOD, AND PROGRAM

(71) Applicant: SONY CORPORATION, Minato-ku (JP)

(72) Inventors: Koichi Sakumoto, Tokyo (JP); Taizo Shirai, Kanagawa (JP); Harunaga Hiwatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 34 days.

(21) Appl. No.: 14/031,444

(22) Filed: Sep. 19, 2013

(65) Prior Publication Data

US 2014/0122894 A1 May 1, 2014

(30) Foreign Application Priority Data

Oct. 30, 2012 (JP) ................................. 2012-238811

(51) Int. Cl.
| | |
|---|---|
| *G06F 21/00* | (2013.01) |
| *G07F 7/12* | (2006.01) |
| *G06F 21/33* | (2013.01) |
| *G06F 21/60* | (2013.01) |
| *H04L 9/32* | (2006.01) |

(52) U.S. Cl.
CPC ........ *G07F 7/12* (2013.01); *G06F 21/33* (2013.01); *G06F 21/602* (2013.01); *G07F 7/125* (2013.01); *H04L 9/3234* (2013.01); *H04L 9/3247* (2013.01); *G06F 2221/2107* (2013.01)

(58) Field of Classification Search
CPC ......... G07F 7/12; G07F 7/125; H04L 9/3234; H04L 9/3247; G06F 21/602; G06F 21/33; G06F 2221/2107

USPC ............................................... 713/185; 726/6
See application file for complete search history.

(56) References Cited

U.S. PATENT DOCUMENTS

| | | | | |
|---|---|---|---|---|
| 6,321,986 | B1 * | 11/2001 | Ackley ..................... | 235/462.01 |
| 6,523,116 | B1 * | 2/2003 | Berman ..................... | 713/182 |
| 2003/0005298 | A1 * | 1/2003 | Smith et al. ............... | 713/171 |
| 2004/0068470 | A1 * | 4/2004 | Klyne ........................ | 705/50 |
| 2005/0100166 | A1 * | 5/2005 | Smetters et al. .......... | 380/277 |
| 2005/0138527 | A1 * | 6/2005 | Gerety et al. ............. | 714/774 |
| 2006/0265590 | A1 * | 11/2006 | DeYoung et al. ......... | 713/176 |
| 2008/0000991 | A1 * | 1/2008 | Yin et al. ................... | 235/494 |
| 2008/0055626 | A1 * | 3/2008 | Root et al. ................. | 358/1.14 |
| 2008/0223935 | A1 * | 9/2008 | Marty et al. ............... | 235/470 |

FOREIGN PATENT DOCUMENTS

| | | |
|---|---|---|
| JP | 9-114719 | 5/1997 |
| JP | 2007-168099 | 7/2007 |

OTHER PUBLICATIONS

Sakumoto, Koichi et al., "Public-Key Identification Schemes based on Multivariate Quadratic Polynomials", CRYPTO2011, 2011, pp. 1-19.*

Garfinkel, Simson, "PGP: Pretty Good Privacy", 1995 O'Reilly & Associates, pp. iv, 236-246.*

* cited by examiner

*Primary Examiner* — Michael Pyzocha
(74) *Attorney, Agent, or Firm* — Sony Corporation

(57) ABSTRACT

There is provided a print medium, whereon a public key used for authentication in a public-key authentication scheme is displayed as character information.

11 Claims, 16 Drawing Sheets

(A)
DIRECTLY RECOGNIZE BY EYE
DIRECTLY INPUT INTO SEPARATE DEVICE BY HAND, OR COMPARE TO KEY DISPLAYED ON SEPARATE DEVICE (B)
RECOGNIZE/INPUT WITH QR CODE READER

PUBLIC-KEY AUTHENTICATION SCHEME

ELECTRONIC SIGNATURE SCHEME

FIG. 7
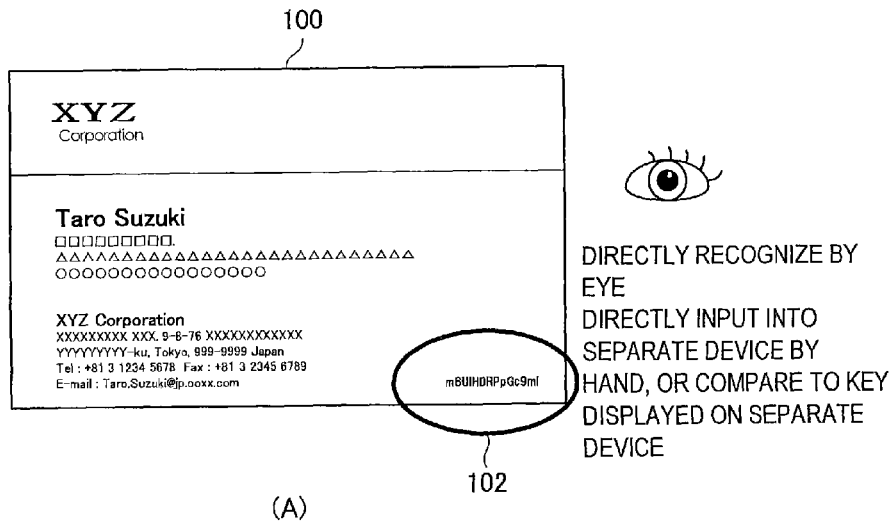
(A)
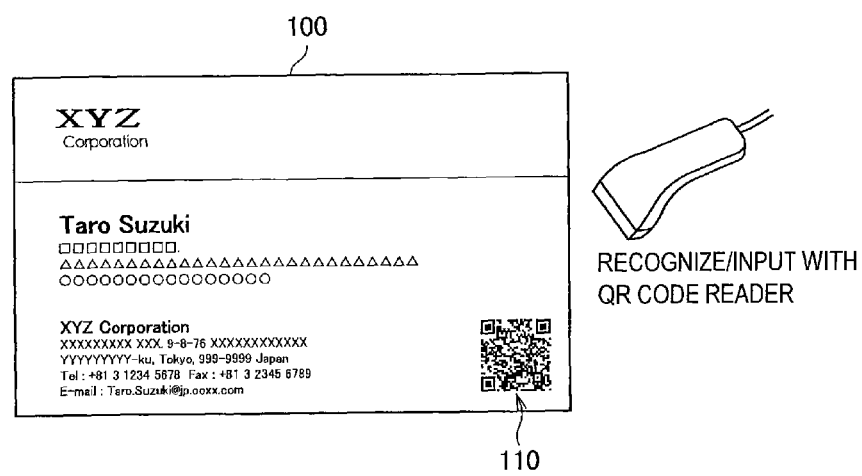
(B)

PRINT MEDIUM, CARD CREATION METHOD, AND PROGRAM

CROSS REFERENCE TO RELATED APPLICATIONS

This application claims the benefit of Japanese Priority Patent Application JP 2012-238811 filed Oct. 30, 2012, the entire contents of which are incorporated herein by reference.

BACKGROUND

The present disclosure relates to a print medium, and to a card creation method and program.

In the related art, Japanese Unexamined Patent Application Publication No. H9-114719 describes the use of a magnetic recording business card onto which a public key is recorded. Also, Japanese Unexamined Patent Application Publication No. 2007-168099 describes recording "a first QR code in which personal information such as a name, address, and email address are encoded" and "a second QR code in which a public key is encoded" onto a business card.

SUMMARY

However, in the above technology of the related art, since a person is unable to directly read a public key stated on the business card, a specialized device may unfortunately become necessary to read the public key. For example, in Japanese Unexamined Patent Application Publication No. H9-114719, a magnetic reading device has to be prepared to read a public key, while in Japanese Unexamined Patent Application Publication No. 2007-168099, a QR code reader has to be prepared to read a public key.

Accordingly, there is demand to enable a person to directly read a public key displayed on a print medium such as a business card or other card.

According to an embodiment of the present disclosure, there is provided a print medium, whereon a public key used for authentication in a public-key authentication scheme is displayed as character information.

Further, the public-key authentication scheme may correspond to an MQ authentication scheme. The character information of the public key may be information in which information with 80 bits or fewer is encoded.

Further, the character information of the public key may be divided into multiple chunks, and a single chunk includes four characters or fewer.

Further, the character information of the public key may be divided into seven chunks or fewer.

Further, the character information of the public key may include information related to error detection or error correction.

Further, the character information of the public key may include information related to a scheme for decoding character information.

Further, the character information of the public key may be used in order to be input into a verification device that conducts verification according to a public-key authentication scheme.

Further, the character information of the public key may be used in judging a match with a public key registered in a verification device that conducts verification in a public-key authentication scheme.

Further, the character information of the public key may be used in judging a match with a public key published by a given user via a network.

Further, the print medium may include information related to an owner's name, and is used as a business card.

Further, according to an embodiment of the present disclosure, there is provided a card creation method including receiving input of a basic entry to be stated on a card, receiving a public key used for authentication in a public-key authentication scheme as input to be stated on a card as character information, and issuing an instruction to print a card including the basic entry and the character information of the public key.

Further, according to an embodiment of the present disclosure, there is provided a program causing a computer to function as an input receiver that receives input of a basic entry to be stated on a card, a public key receiver that receives a public key used for authentication in a public-key authentication scheme as input to be stated on a card as character information, and a print instruction unit that issues an instruction to print a card including the basic entry and the character information of the public key.

According to one or more embodiments of the present disclosure, it becomes possible for a person to directly read a public key displayed on a print medium such as a business card or other card.

BRIEF DESCRIPTION OF THE DRAWINGS

FIG. 7 is a schematic diagram illustrating a business card printed with a public key according to the present embodiment, and a business card printed with public key information encoded as a QR code;

DETAILED DESCRIPTION OF THE EMBODIMENT(S)

Figure 1:
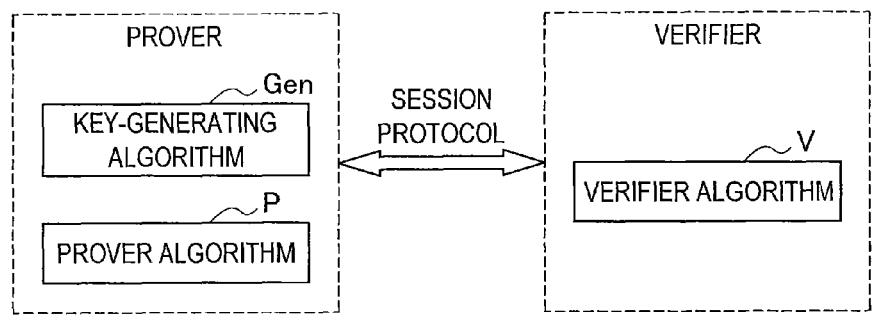
FIG. 1 is a schematic diagram summarizing algorithms for a public-key authentication scheme.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of the description regarding the embodiments of the present technology described hereinafter will be now briefly discussed. First, an algorithm structure for a public-key authentication scheme will be described with reference to FIG. 1. Next, an algorithm structure for an electronic signature scheme will be described with reference to FIG. 2. Next, an n-pass public-key authentication scheme will be described with reference to FIG. 3.

Next, an example of algorithm structures related to a 3-pass public-key authentication scheme will be described with reference to FIGS. 4 and 6. Next, the first through fourth embodiments of the present disclosure will be described with reference to FIGS. 7 to 18.

TABLE OF CONTENTS

1. Introduction
1-1. Algorithm for public-key authentication scheme
1-2. Algorithm for electronic signature scheme
1-3. N-pass public-key authentication scheme
2. Algorithm structures related to 3-pass public-key authentication scheme
2-1. Example of specific algorithm structures
2-2. Example of parallelized algorithm structures
3. Modification to electronic signature scheme
3-1. Modification from 3-pass public-key authentication scheme to electronic signature scheme
4. Specific embodiments
4-1. Summary of system according to an embodiment of present disclosure
4-2. Examples of stating public key on business card
4-3. Situations in which business card according to present embodiment is used
4-4. Exemplary configuration of system according to present embodiment
4-5. Process of creating a business card
4-6. Example of adding error-detecting code or error-correcting code to public key
4-7. Encoding methods other than base64

1. Introduction

The embodiments herein relate to a public-key authentication scheme and an electronic signature scheme that base their safety on the difficulty of solving high-order, multivariate systems of equations. However, the embodiments herein differ from techniques of the related art such as HFE electronic signature schemes, and relate to a public-key authentication scheme and an electronic signature scheme that utilize high-order, multivariate systems of equations that lack a mechanism of efficient solving (trapdoors). First, algorithms for a public-key authentication scheme, algorithms for an electronic signature scheme, and an n-pass public-key authentication scheme will be briefly summarized.

[1-1. Algorithms for Public-Key Authentication Scheme]

First, algorithms for a public-key authentication scheme (MQ authentication scheme) will be summarized with reference to FIG. 1. FIG. 1 is an explanatory diagram algorithms for public-key authentication scheme.

Public-key authentication is used in order for a certain person (the prover, also referred to as Alice) to convince another person (the verifier, also referred to as Bob) that she is herself by using a public key pk and a secret key sk. For example, Alice's public key $pk_A$ is disclosed to Bob. On the other hand, Alice keeps her secret key $sk_A$ a secret. In the public-key authentication setup, it is assumed that Alice herself is the person who knows the secret key $sk_A$ corresponding to the public key $pk_A$.

In order for Alice to prove to Bob that she is Alice herself using the public-key authentication setup, Alice, via a session protocol, presents proof to Bob indicating that she knows the secret key $sk_A$ corresponding to the public key $pk_A$. The proof indicating the Alice knows the secret key $sk_A$ is then presented to Bob, and in the case where Bob is able to confirm that proof, the validity of Alice (the fact that Alice is herself) is proven.

However, a public-key authentication setup demands the following conditions in order to ensure safety.

The first condition is that a forger who does not possess the secret key sk when executing the session protocol has a vanishingly small probability of creating a forgery. Upholding the first condition is called "soundness". In other words, soundness may be restated as: "a forger lacking a secret key sk has a negligible chance of establishing a forgery during the session protocol." The second condition is that no information about Alice's secret key $sk_A$ is divulged to Bob, even if executing the session protocol. Upholding the second condition is called "zero-knowledge".

Conducting public-key authentication safely involves using a session protocol exhibiting both soundness and zero-knowledge. If an authentication process were hypothetically conducted using a session protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

As illustrated in FIG. 1, the two identities of prover and verifier exist in a model of a public-key authentication scheme. The prover uses a key-generating algorithm Gen to generate a paired secret key sk and public key pk unique to the prover. Subsequently, the prover uses the paired secret key sk and public key pk generated using the key-generating algorithm Gen to execute a session protocol with a verifier. At this point, the prover executes the session protocol by using a prover algorithm P. As above, the prover uses the prover algorithm P to present proof that she possesses the secret key sk to the verifier during the session protocol.

Meanwhile, the verifier executes the session protocol using a verifier algorithm V, and verifies whether or not the prover possesses the secret key corresponding to the public key made public by that prover. In other words, the verifier is an entity that verifies whether or not the prover possesses the secret key that corresponds to the public key. In this way, the model of a public-key authentication scheme is made up of the two entities of the verifier and the verifier, and the three algorithms of the key-generating algorithm Gen, the prover algorithm P, and the verifier algorithm V.

Figure 14:
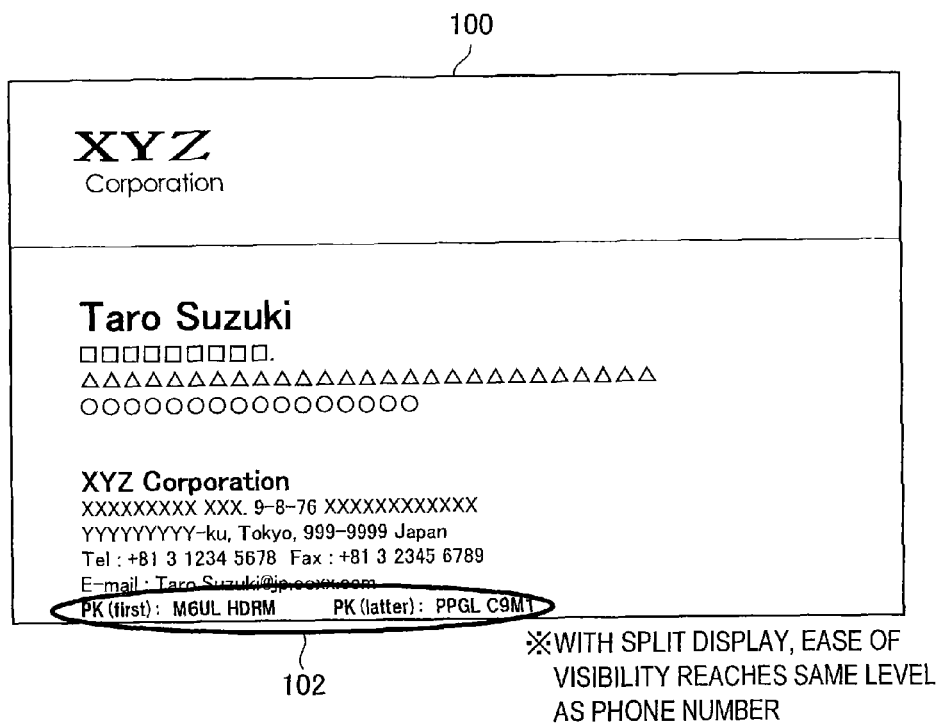
FIG. 14 is a schematic diagram illustrating the case of encoding a public key in base64, and displaying the encoded public key split into a first part and a latter part.

Note that although the terms "prover" and "verifier" are used in the description hereinafter, these terms ultimately mean entities. Consequently, the agent that executes the key-generating algorithm Gen and the prover algorithm P is an information processing apparatus corresponding to the "prover" entity. Similarly, the agent that executes the verifier algorithm V is an information processing apparatus. The hardware configuration of these information processing apparatus is as illustrated in FIG. 14, for example. In other words, the key-generating algorithm Gen, the prover algorithm P, and the verifier algorithm V are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the prover. The key-generating algorithm Gen is an algorithm that generates a paired secret key sk and public key pk unique to the prover. The public key pk generated by the key-generating algorithm Gen is made public. The public key pk thus made public is then used by the verifier. Meanwhile, the prover keeps the secret key sk generated by the key-generating algorithm Gen a secret. The secret key sk kept secret by the prover is then used to prove to the verifier that the prover possesses the secret key sk corresponding to the public key pk. Formally, the key-generating algorithm Gen is expressed as an algorithm like the following Eq. 1, which accepts a security parameter $1^\lambda$ (where $\lambda$ is an integer equal to or greater than 0) as input, and outputs a secret key sk and a public key pk.

$$(sk, pk) \leftarrow (\text{Gen}(1^\lambda)) \quad (1)$$

(Prover Algorithm P)

The prover algorithm P is used by the prover. The prover algorithm P is an algorithm for proving to the verifier that the prover possesses the secret key sk corresponding to the public key pk. In other words, the prover algorithm P is an algorithm that accepts a secret key sk and a public key pk as input, and executes a session protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following Eq. 2.

$$0/1 \leftarrow V(pk) \quad (2)$$

As above, realizing meaningful public-key authentication involves having the session protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key-generating algorithm Gen, prover algorithm P, and verifier algorithm V are skillfully designed to satisfy these requirements.

The foregoing thus summarizes the algorithms in a public-key authentication scheme.

[1-2. Algorithms for Electronic Signature Scheme]

Figure 2:
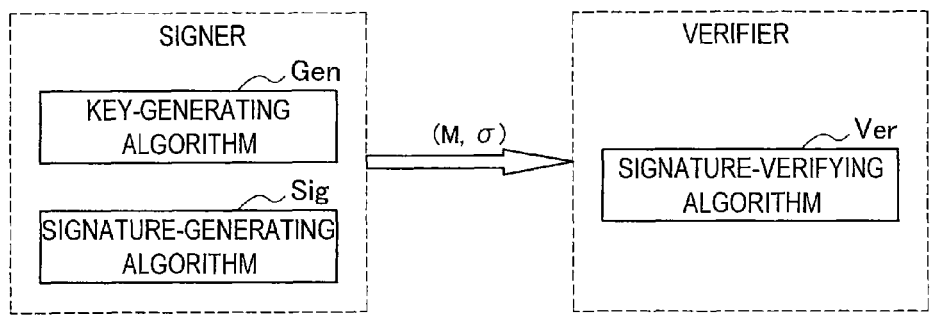
FIG. 2 is a schematic diagram summarizing algorithms for an electronic signature scheme.

Next, algorithms for an electronic signature scheme will be summarized with reference to FIG. 2. FIG. 2 is an explanatory diagram summarizing algorithms for an electronic signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is electronic signatures. An electronic signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of an electronic signature scheme. In addition, the model of an electronic signature scheme is made up of three algorithms: a key-generating algorithm Gen, a signature-generating algorithm Sig, and a signature-verifying algorithm Ver.

The signer uses the key-generating algorithm Gen to generate a paired signature key sk and verification key pk unique to the signer. The signer also uses the signature-generating algorithm Sig to generate an electronic signature σ to attach to a message M. In other words, the signer is an entity that attaches an electronic signature to a message M. Meanwhile, the verifier uses the signature-verifying algorithm Ver to verify the electronic signature σ attached to the message M. In other words, the verifier is an entity that verifies the electronic signature σ in order to confirm whether or not the creator of the message M is the signer.

Note that although the terms "signer" and "verifier" are used in the description hereinafter, these terms ultimately mean entities. Consequently, the agent that executes the key-generating algorithm Gen and the signature-generating algorithm Sig is an information processing apparatus corresponding to the "signer" entity. Similarly, the agent that executes the signature-verifying algorithm Ver is an information processing apparatus. The hardware configuration of these information processing apparatus is as illustrated in FIG. 14, for example. In other words, the key-generating algorithm Gen, the signature-generating algorithm Sig, and the signature-verifying algorithm Ver are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the signer. The key-generating algorithm Gen is an algorithm that generates a paired signature key sk and verification key pk unique to the signer. The verification key pk generated by the key-generating algorithm Gen is made public. Meanwhile, the signer keeps the signature key sk generated by the key-generating algorithm Gen a secret. The signature key sk is then used to generate electronic signature σ to attach to a message M. For example, the key-generating algorithm Gen accepts a security parameter $1^\lambda$ (where λ is an integer equal to or greater than 0) as input, and outputs a signature key sk and a verification key pk. In this case, the key-generating algorithm Gen may be expressed formally as in the following Eq. 3.

$$(sk, pk) \leftarrow \text{Gen}(1^\lambda) \quad (3)$$

(Signature-Generating Algorithm Sig)

The signature-generating algorithm Sig is used by the signer. The signature-generating algorithm Sig is an algorithm that generates an electronic signature σ to be attached to a message M. The signature-generating algorithm Sig is an algorithm that accepts a signature key sk and a message M as input, and outputs an electronic signature σ. The signature-generating algorithm Sig may be expressed formally as in the following Eq. 4.

$$\sigma \leftarrow \text{Sig}(sk, M) \quad (4)$$

(Signature-Verifying Algorithm Ver)

The signature-verifying algorithm Ver is used by the verifier. The signature-verifying algorithm Ver is an algorithm that verifies whether or not the electronic signature σ is a valid electronic signature for the message M. The signature-verifying algorithm Ver is an algorithm that accepts a signer's verification key pk, a message M, and an electronic signature σ as input, and outputs 0 or 1 (1 bit). The signature-verifying algorithm Ver may be expressed formally as in the following Eq. 5. At this point, the verifier decides that the electronic signature σ is invalid in the case where the signature-verifying algorithm Ver outputs 0 (the case where the verification key pk rejects the message M and the electronic signature σ), and decides that the electronic signature σ is valid in the case where the signature-verifying algorithm Ver outputs 1 (the case where the verification key pk accepts the message M and the electronic signature σ).

$$0/1 \leftarrow \text{Ver}(pk, M, \sigma) \quad (5)$$

The foregoing thus summarizes the algorithms in an electronic signature scheme.

[1-3. N-Pass Public-Key Authentication Scheme]

Figure 3:
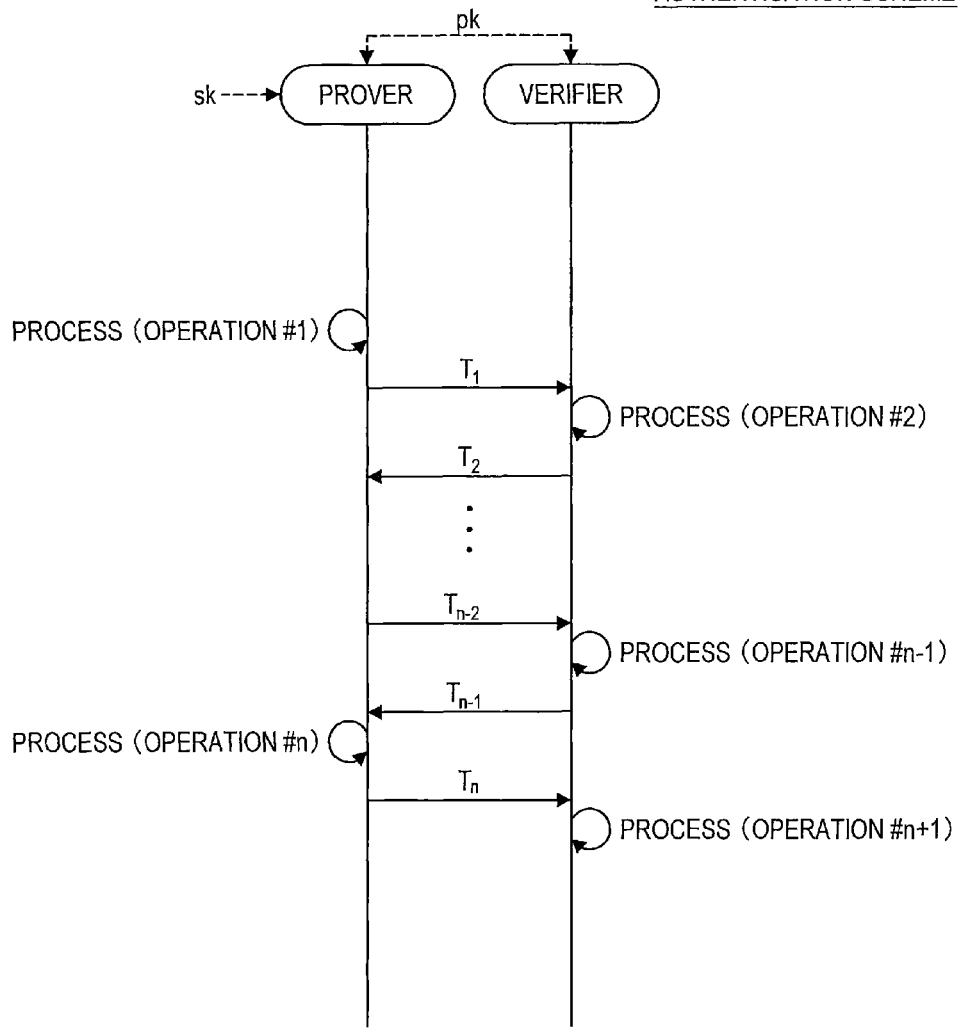
FIG. 3 is an explanatory diagram illustrating an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during a session protocol. In addition, the session protocol has to satisfy the two conditions of soundness and zero-knowledge. For this reason, during the session protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

2. Algorithm Structures Related to 3-Pass Public-Key Authentication Scheme

Hereinafter, algorithms related to a 3-pass public-key authentication scheme will be described. Note that in the following description, a 3-pass public-key authentication scheme may also be referred to as a "3-pass scheme" in some cases.

[2-1. Example of Specific Algorithm Structures (FIG. 4)]

Figure 4:
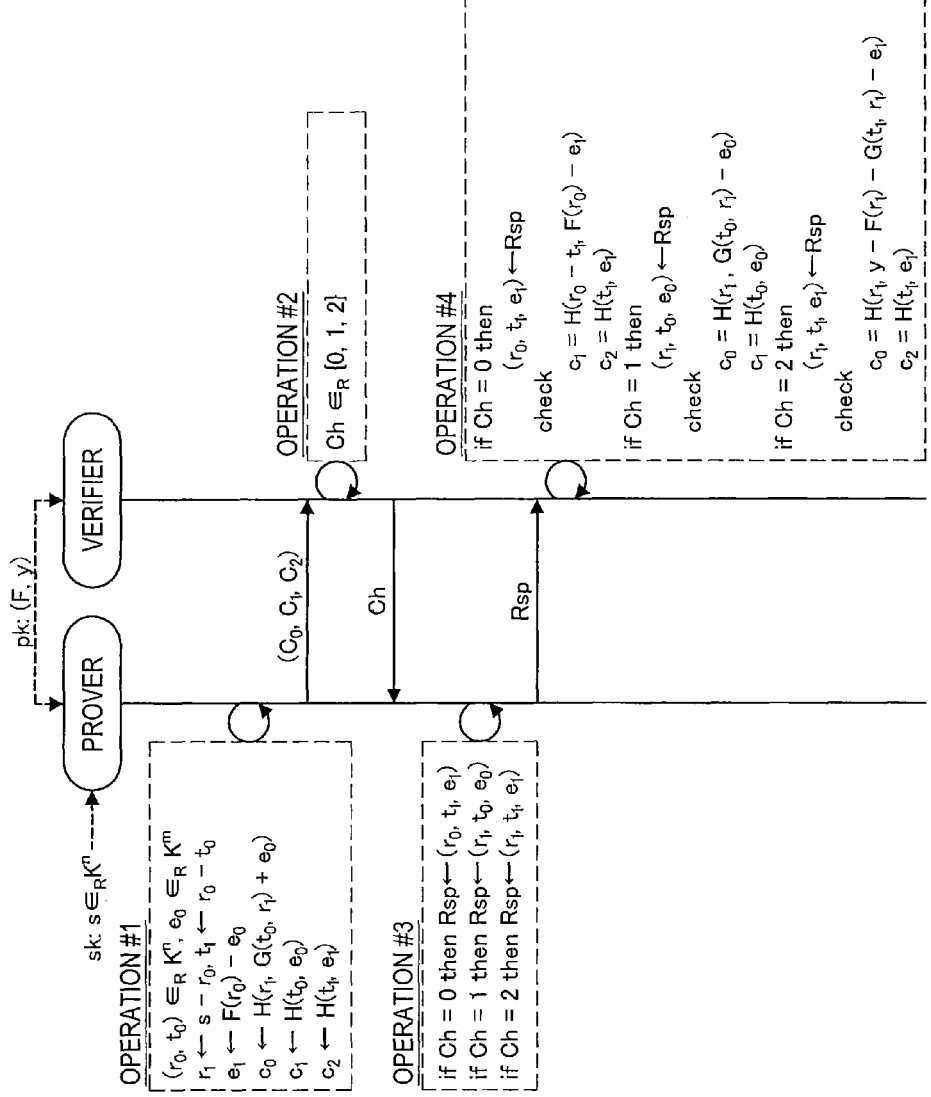
FIG. 4 is a diagram illustrating specific algorithm structures related to a 3-pass scheme.

First, an example of specific algorithm structures related to a 3-pass scheme will be introduced with reference to FIG. 4. FIG. 4 is a diagram illustrating specific algorithm structures related to a 3-pass scheme. At this point, consider the case of using a system of second-order polynomials $(f_1(x), \ldots, f_m(x))$ as part of a public key pk. However, assume that a second-order polynomial $f_i(x)$ is expressed as in the following Eq. 6. In addition, x will denote the vectors $(x_1, \ldots, x_n)$, and the multivariate polynomial F(x) will denote the system of second-order polynomials $(f_1(x), \ldots, f_m(x))$.

$$f_i(x_1, \ldots, x_n) = \sum_{j,k} a_{ijk} x_j x_k + \sum_j b_{ij} x_j \quad (6)$$

The system of second-order polynomials $(f_1(x), \ldots, f_m(x))$ may also be expressed as in the following Eq. 7, where $A_1$ to $A_m$ are n×n matrices, and $b_1$ to $b_m$ are respective n×1 vectors.

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

Using this expression, the multivariate polynomial F may be expressed as in the following Eq. 8 and 9. These expressions may be easily confirmed from Eq. 10 below.

$$F(x+y) = F(x) + F(y) + G(x, y) \quad (8)$$

$$G(x, y) = \begin{pmatrix} y^T(A_1^T + A_1)x \\ \vdots \\ y^T(A_m^T + A_m)x \end{pmatrix} \quad (9)$$

$$\begin{aligned} f_l(x+y) &= (x+y)^T A_l(x+y) + b_l^T(x+y) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T A_l^T x + y^T A_l x \\ &= f_l(x) + f_l(y) + y^T (A_l^T + A_l) x \end{aligned} \quad (10)$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) may be referred to as the bilinear term in some cases. Using this property enables the construction of an efficient algorithm.

For example, use the vector $t_0$ that is an element of the set $K^n$ and the vector $e_0$ that is an element of the set $K^m$ to express the multivariate polynomial $F^1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in Eq. 11 below. Provided that $t_1=r_0+t_0$ and $e_1=F(r_0)+e_0$, the multivariate polynomial $F_2(x)=F(x+r_0)+F_1(x)$ can be expressed by the vector $t_1$ that is an element of the set $K^n$ and the vector $e_1$ that is an element of the set $K^m$. For this reason, setting $F_1(x)=G(x, t_0)+e_0$ enables the expression of $F_1$ and $F_2$ using a vector in $K^n$ and a vector in $K^m$, making it possible to realize an efficient algorithm with a small data size for communication.

$$F(x+r_0) + F_1(x) = F(x) + F(r_0) + G(x, r_0) + G(x, t_0) + e_0 \quad (11)$$
$$= F(x) + G(x, r_0 + t_0) + F(r_0) + e_0$$

Note that no information regarding $r_0$ is divulged from $F_2$ (or $F_1$). For example, even if $e_1$ and $t_1$ (or $e_0$ and $t_0$) are given, no information about $r_0$ is ascertained as long as $e_0$ and $t_0$ (or $e_1$ and $t_1$) are unknown. Consequently, zero-knowledge is ensured. Hereinafter, algorithms for a 3-pass scheme constructed on the basis of the above logic will be described. The algorithms for the 3-pass scheme described herein are made up of a key-generating algorithm Gen, a prover algorithm P, and a verifier algorithm V like the following.

(Key-Generating Algorithm Gen)

The key-generating algorithm Gen generates m multivariate polynomials $f_1(x_1, \ldots, x_n), \ldots, f_m(x_1, \ldots, x_n)$ defined on a ring K, and a vector $s=(s_1, \ldots, s_n)$ that is an element of the set $K^n$. Next, the key-generating algorithm Gen calculates $y=(y_1, \ldots, y_m) \leftarrow (f_1(s), \ldots, f_m(s))$. The key-generating algorithm Gen also sets $f_1(x_1, \ldots, x_n), \ldots, f_m(x_1, \ldots, x_n)$ as the public key, and set s as the secret key.

(Prover Algorithm P, Verifier Algorithm V)

Hereinafter, a process executed by the prover algorithm P and a process executed by the verifier algorithm V during the session protocol will be described with reference to FIG. 4. During the session protocol, the prover indicates to the verifier that "I know an s satisfying $y=F(s)$", without divulging information about the secret key s to the verifier. Meanwhile, the verifier verifies whether or not the prover knows an s satisfying $y=F(s)$. Note that the public key pk is assumed to be made public to the verifier. Also, the secret key s is assumed to be kept a secret by the prover. Hereinafter, the description will proceed following the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0 - t_0$. Subsequently, the prover algorithm P calculates $e_1 \leftarrow F(r_0) - e_0$.

Operation #1 (Continued):

Subsequently, the prover algorithm P calculates $c_0 \leftarrow H(r_1, G(t_0, r_1) e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_1, F(r_0)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The foregoing thus describes an example of efficient algorithm structures related to a 3-pass scheme.

[2-2. Example of Parallelized Algorithm Structures (FIG. 5)]

Next, a method of parallelizing the algorithms of the 3-pass scheme illustrated in FIG. 4 will be described with reference to FIG. 5. However, further description of the structure of the key-generating algorithm Gen will be omitted.

Applying the above session protocol makes it possible to keep the probability of a successful forgery to ⅔ or less. Consequently, executing the session protocol twice makes it possible to keep the probability of a successful forgery to $(2/3)^2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Conceivable methods of executing a session protocol multiple times include a serial method that sequentially repeats the exchange of message, challenge, and response multiple times, and a parallel method that exchanges multiple messages, challenges, and responses in a single exchange, for example. In addition, hybrid methods combining a serial method and a parallel method are also conceivable. Algorithms that execute the above session protocol related to a 3-pass scheme in parallel (hereinafter designated parallelized algorithms) will now be described with reference to FIG. 5.

Figure 5:
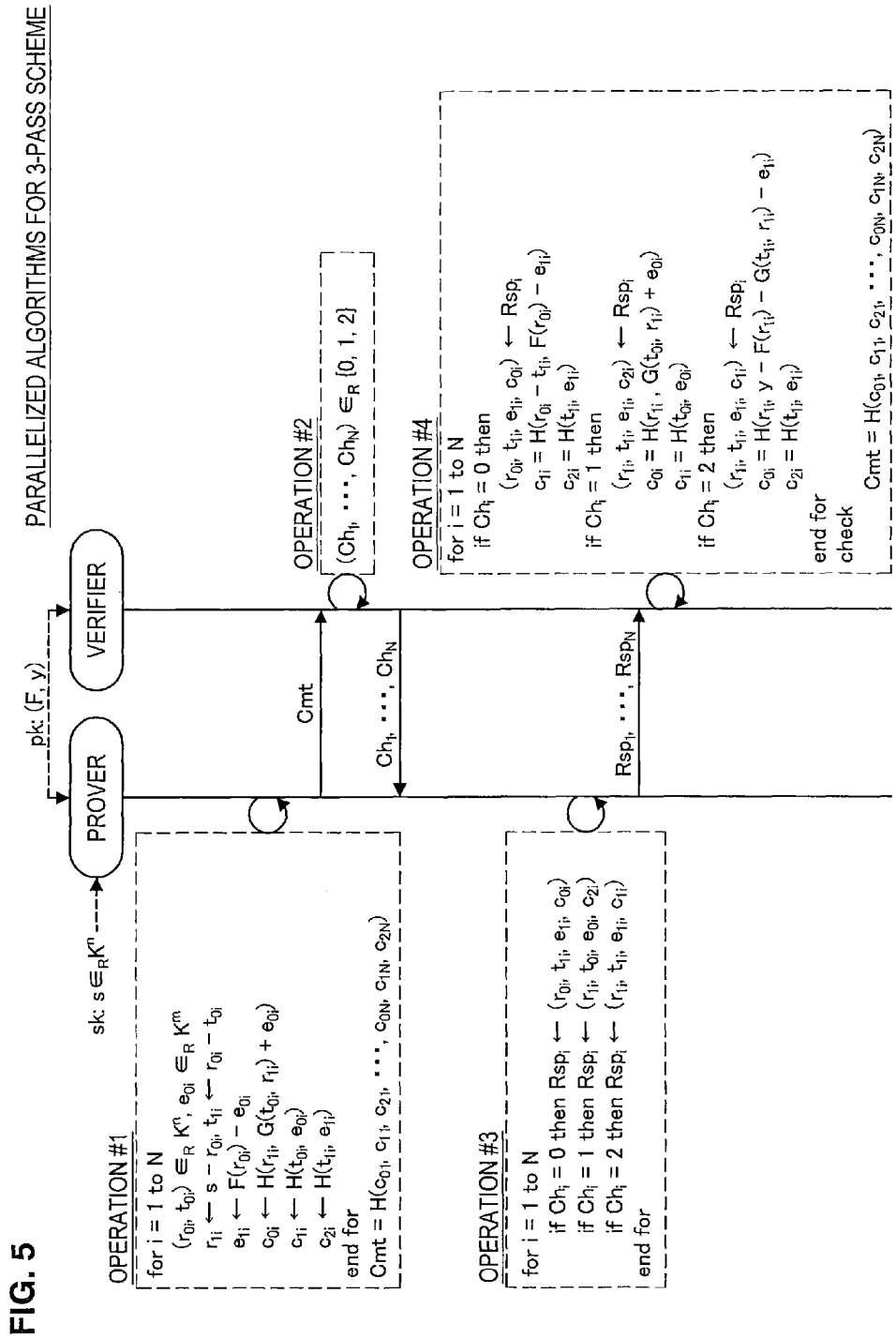
FIG. 5 is a schematic diagram illustrating a method of parallelizing the algorithms for the 3-pass scheme illustrated in FIG. 4.

Operation #1:

As illustrated in FIG. 5, the prover algorithm P first executes the following processes (1) to (6) for i=1 to N.

Process (1): The prover algorithm P randomly generates the vectors $r_{0i}$, $t_{0i}$ that are elements of the set $K^n$, and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{0i}$. Additionally, the prover algorithm P calculates $t_{1i} \leftarrow r_{0i}+t_{0i}$.

Process (3): The prover algorithm P calculates $e_{1i} \leftarrow F(r_{0i})-e_{0i}$.

Process (4): The prover algorithm P calculates $c_{0i} \leftarrow H(r_{1i}, t_{0i})+e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates $Cmt \leftarrow H(c_{01}, c_{11}, c_{21}, \ldots, c_{0N}, c_{1N}, c_{2N})$. The hash value Cmt generated in operation #1 is sent to the verifier algorithm V. In this way, the message $(c_{01}, c_{11}, c_{21}, \ldots, c_{0N}, c_{1N}, c_{2N})$ is converted into a hash value before being sent to the verifier algorithm V, thus enabling a reduction in the communication volume. Note that the prover algorithm P may also send $(c_{01}, c_{11}, c_{21}, \ldots, c_{0N}, c_{1N}, c_{2N})$ to the verifier algorithm V.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i=(r_{0i}, t_{1i}, e_{1i}, c_{0i})$. In the case where $Ch_i=1$, the prover algorithm P generates a response $Rsp_i=(r_{1i}, t_{0i}, e_{0i}, c_{2i})$. In the case where $Ch_i=2$, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_i$. Subsequently, the verifier algorithm V calculates $c_{0i}=H(r_{1i}, G(t_{0i}, r_{1i})+e_{0i})$. In addition, the verifier algorithm V calculates $c_{1i}=H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i}=H(r_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The foregoing thus describes an example of efficient parallelized algorithm structures related to a 3-pass scheme.

3. Modification to Electronic Signature Scheme

Next a method of modifying the above public-key authentication scheme to an electronic signature scheme will be introduced.

Associating the prover in the model of the public-key authentication scheme with the signer in the electronic signature scheme easily demonstrates that the model of a public-key authentication scheme approximates the model of the electronic signature scheme in that only the prover is able to convince the verifier. On the basis of this thinking, a method of modifying the public-key authentication scheme discussed above to an electronic signature scheme will be described.

[3-1. Modification from 3-Pass Public-Key Authentication Scheme to Electronic Signature Scheme (FIG. 6)]

First, the modification from a 3-pass public-key authentication scheme to an electronic signature scheme will be described. As illustrated in FIG. 6, the algorithms modified from the 3-pass public-key authentication scheme to the electronic signature scheme are similar to parts of the parallelized versions of the algorithms from the 3-pass scheme described with FIG. 5. The algorithms for the public-key authentication scheme expressed by operation #1 to operation #4 in FIG. 5 are modified into a signature-generating algorithm Sig and a signature-verifying algorithm Ver as illustrated in FIG. 6.

Figure 6:
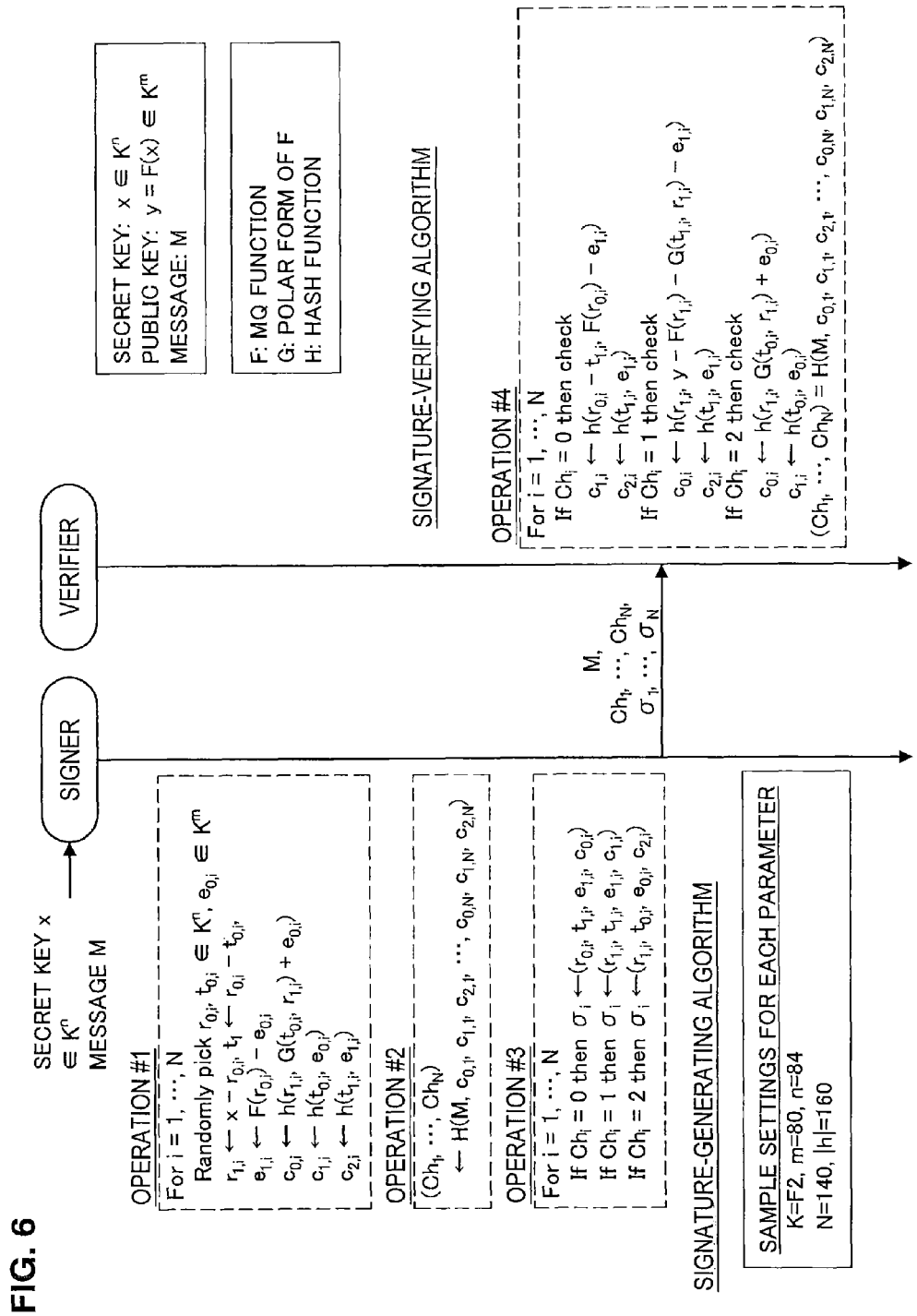
FIG. 6 is a schematic diagram illustrating a modification from a 3-pass public-key authentication scheme to an electronic signature scheme.

Operation #1:

As illustrated in FIG. 6, operation #1 is similar to operation #1 in FIG. 5.

Operation #2:

In the next operation #2, $Cmt \leftarrow H(c_{01}, c_{11}, c_{21}, \ldots, c_{0N}, c_{1N}, c_{2N})$ which was sent to the verifier algorithm V in FIG. 5 is not sent to the signature-verifying algorithm Ver, and instead, the signature-generating algorithm Sig calculates the hash value $H(M, c_{01}, c_{11}, c_{21}, \ldots, c_{0N}, c_{1N}, c_{2N})$ of a message M with an attached Cmt and signature as $(Ch_1, \ldots, Ch_N)$. In other words, the signature-generating algorithm Sig calculates $(Ch_1, \ldots, Ch_N) \leftarrow c_{01}, c_{11}, c_{21}, \ldots, c_{0N}, c_{1N}, c_{2N}$.

Operation #3:

As illustrated in FIG. 6, operation #3 is similar to operation #3 in FIG. 5. The signature-generating algorithm Sig generates a $\sigma_i$ to send to the signature-verifying algorithm Ver in response to each of $Ch_1, \ldots, Ch_N$. In the case where $Ch_i=0$, the signature-generating algorithm Sig generates a response $\sigma_i=(r_{0i}, t_{1i}, e_{1i}, c_{0i})$. In the case where $Ch_i=1$, the signature-generating algorithm Sig generates a response $\sigma_i=(r_{1i}, t_{0i}, e_{0i}, c_{2i})$. In the case where $Ch_i=2$, the signature-generating algorithm Sig generates a response $\sigma_i=(r_{1i}, t_{1i}, e_{1i}, c_{1i})$.

$Ch_1, \ldots, Ch_N$ and $\sigma_1, \ldots, \sigma_N$ generated in operation #3 are sent to the signature-verifying algorithm Ver. At the same time, the message M with attached signature is also sent to the signature-verifying algorithm Ver.

Operation #4:

As illustrated in FIG. 6, operation #4 is basically similar to operation #4 in FIG. 5. Upon receiving the responses $\sigma_1, \ldots, \sigma_N$, the signature-verifying algorithm Ver executes the following processes (1) to (3) for i=1 to N, using the received responses $\sigma_1, \ldots, \sigma_N$. Herein, the signature-verifying algorithm Ver executes the process (1) for the case where $Ch_i=0$, the process (2) in the case where $Ch_i=1$, and the process (3) in the case where $Ch_i=2$.

Process (1): In the case where $Ch_i=0$, the signature-verifying algorithm Ver retrieves $(r_{0i}, t_{1i}, e_{1i}, c_{0i})$ from $\sigma_i$. Subsequently, the signature-verifying algorithm Ver calculates $c_{1i}=H(r_{0i}-t_{1i}, F(r_{0i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

Process (2): In the case where $Ch_i=1$, the signature-verifying algorithm Ver retrieves $(r_{1i}, t_{0i}, e_{0i}, c_{2i})$ from $\sigma_i$. Subsequently, the signature-verifying algorithm Ver calculates $c_{0i}=H(r_{1i}, G(t_{0i}, r_{1i})+e_{1i})$. In addition, the signature-verifying algorithm Ver calculates $c_{1i}=H(t_{0i}, e_{0i})$. The signature-verifying algorithm Ver then stores $(c_{0i}, c_{1i}, c_{2i})$.

Process (3): In the case where $Ch_i=2$, the signature-verifying algorithm Ver retrieves $(r_{1i}, t_{1i}, e_{1i}, c_{1i})$ from $\sigma_i$. Subsequently, the signature-verifying algorithm Ver calculates $c_{0i}=H(r_{1i}, y-F(r_{1i})-G(t_{1i}, r_{1i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

After executing the above processes (1) to (3) for i=1 to N, the signature-verifying algorithm Ver verifies whether or not the equality of $(Ch_1, \ldots, Ch_N)=H(M, c_{01}, c_{11}, c_{21}, \ldots, c_{0N}, c_{1N}, c_{2N})$ holds. The signature-verifying algorithm Ver outputs the value 1 to indicate authentication success in the case where the verification succeeds, and outputs the value 0 to indicate authentication failure in the case where the verification fails.

As described above, associating the prover in the model of a public-key authentication scheme with the signer in an electronic signature scheme enables the modification of the algorithms for the public-key authentication scheme into algorithms for the electronic signature scheme.

4. Specific Embodiment

[4-1. Summary of System According to an Embodiment of Present Disclosure]

In the present embodiment, a public key used in an electronic signature scheme as discussed above is stated on a business card, thereby distributing the public key to a person receiving the business card. In the case of stating a public key on a business card, ideally the signature verifier recognizes the public key without error. In the present embodiment, by printing a public key onto a business card as character information, a signature verifier becomes able to recognize a public key without error, and without using a specialized device for reading the public key. Note that although the present embodiment exemplifies the case of stating a public key on a business card, stating a public key on another portable card or the like, such as a credit card or employee badge, is obviously also possible.

In the case of an MQ signature scheme, the length of a public key may be set to at least 80 bits. For this reason, in the case of encoding a public key in base64 (a technique of expressing 6 bits of information with one character), for example, a public key made up of a string of at least 14 characters may be directly printed onto a business card as character information. Thus, a person is able to read a public key without using an additional device, and in addition, reliably moderating public key recognition errors is possible.

FIG. 7(A) is a schematic diagram illustrating an example of stating a public key 102 onto a business card 100 as 14-character character information. In this way, the present embodiment enables a public key 102 to be printed and indicated on an ordinary business card 100, making it possible to distribute the public key 102 at the same time as handing over the business card 100.

On the other hand, in the case of a technique that encodes and records public key information as a QR code 110 as illustrated in FIG. 7(B), an additional device such as a QR code reader for ascertaining the public key information may be necessary on the side that receives the public key information.

Consequently, according to the present embodiment, a public key 102 expressed as character information may be directly recognized by the eyes, and then input into another device or compared to a public key being displayed on a separate device.

[4-2. Examples of Stating Public Key on Business Card]

Examples of stating a public key 102 on a business card 100 will now be specifically described. As discussed above, in the case of encoding with a technique such as base64, the public key length in the MQ signature scheme may be set to approximately 80 bits. As illustrated in FIG. 7(A), 14 characters may be displayed consecutively, but it is desirable to display the 14 characters divided into multiple parts according to the types of human memory.

Typically, the modes of human memory are classified into the three modes of sensory memory, short-term memory, and long-term memory. Sensory memory is memory that stores a maximum of approximately 1-2 seconds of text, sound, or the like, whereas short-term memory is memory that is stored in the short term (up to approximately 20 seconds). Meanwhile, long-term memory is memory that is stored for life unless forgotten. Of these, sensory memory is taken to have a capacity of four, and able to remember four "sensed units". In the case of characters, momentarily seeing and sensorily remembering four characters is possible, but remembering five or more characters is difficult, "eye movement" occurs, and the data is edited in short-term memory. Meanwhile, the capacity of short-term memory is taken to be 7±2. In short-term memory, it is possible to remember seven units capable of being semantically grouped (hereinafter designated "chunks"). Consequently, in the case of dividing and stating a public key 102 in multiple parts on a business card 100, it is desirable to set a single chunk to four characters or fewer, and set the total number of chunks to seven or fewer.

Figure 8:
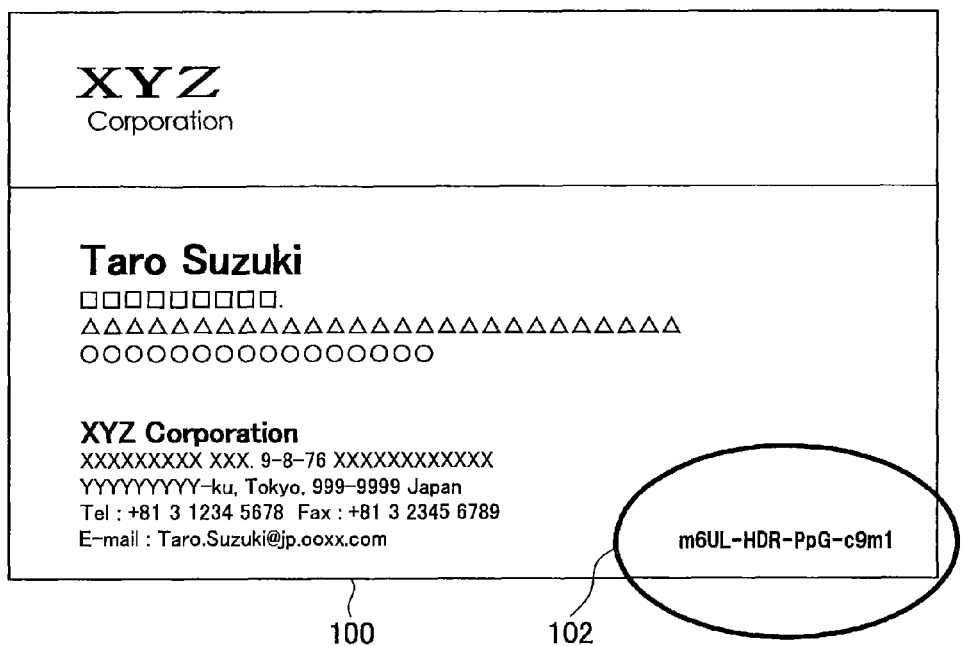
FIG. 8 is a schematic diagram illustrating the case of encoding an 80-bit public key into 14 characters in base64, editing the characters into four chunks of 4-3-3-4 characters, and printing the edited characters onto a business card.
Figure 9:
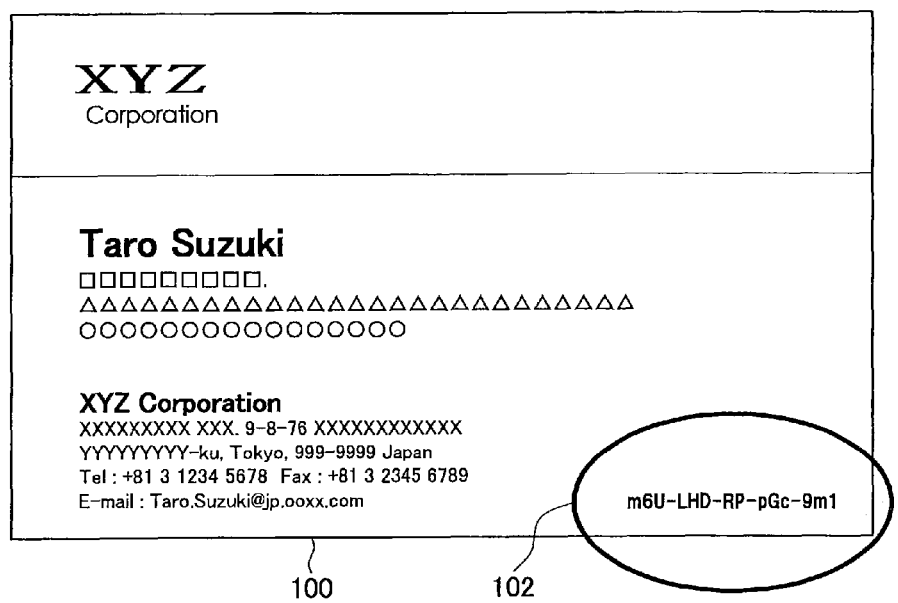
FIG. 9 is a schematic diagram illustrating the case of encoding an 80-bit public key into 14 characters in base64, editing the characters into five chunks of 3-3-2-3-3 characters, and printing the edited characters onto a business card.

From this perspective, FIG. 8 illustrates the case of encoding an 80-bit public key into 14 characters in base64, editing the characters into four chunks of 4-3-3-4 characters, and printing a public key 102 (m6UL-HDR-PpG-c9m1) onto a business card 100. Also, FIG. 9 illustrates the case of encoding an 80-bit public key into 14 characters in base64, editing the characters into five chunks of 3-3-2-3-3 characters, and printing a public key 102 (m6U-LHD-RP-pGc-9m1) onto a business card 100. In this way, a public key 102 made up of 80 bits may be expressed as 14 alphanumeric characters by being encoded. Consequently, as illustrated in FIGS. 8 and 9, it is possible to state a public key 102 on a part of a business card 100 similarly to a phone number, address, email address, or the like, with the display range of the public key 102 being sufficiently small with respect to the area of the business card 100. Also, by setting a single chunk to four characters or fewer, and setting the total number of chunks to seven or fewer, it is possible to display a public key in a way that is more easily remembered by a user.

Figure 10:
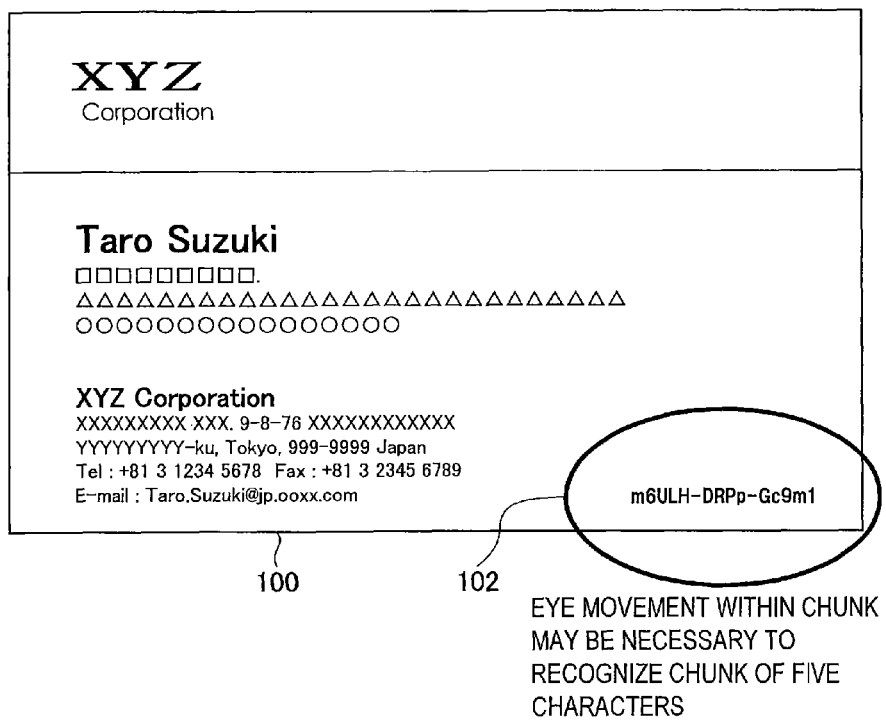
FIG. 10 is a schematic diagram illustrating the case of encoding an 80-bit public key into 14 characters in base64, editing the characters into three chunks of 5-4-5 characters, and printing the edited characters onto a business card.
Figure 11:
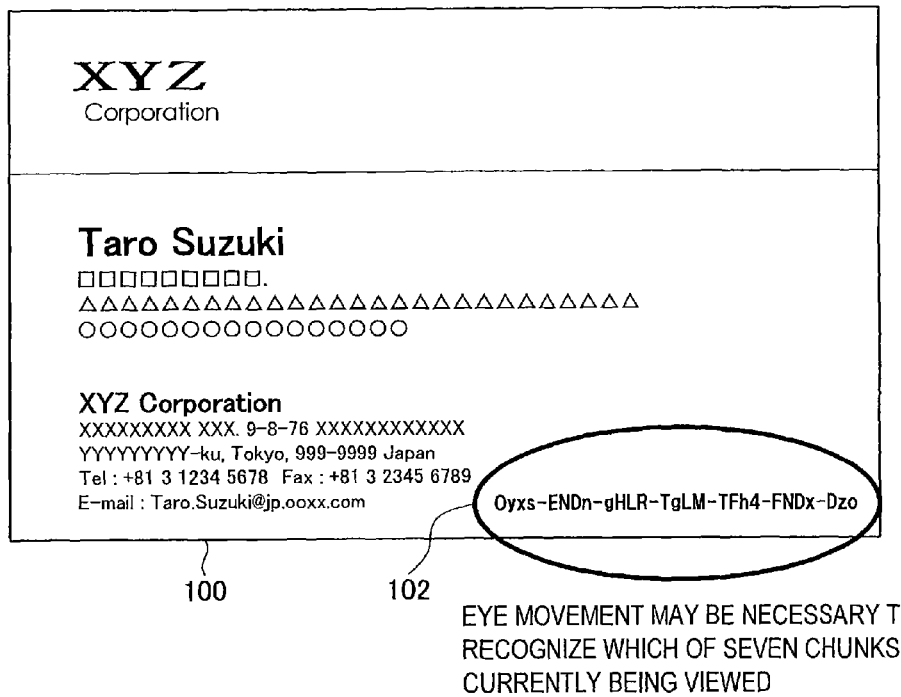
FIG. 11 is a schematic diagram illustrating the case of encoding a 160-bit public key into 27 characters in base64, editing the characters into seven chunks of 4-4-4-4-4-4-3 characters, and printing the edited characters onto a business card.
Figure 12:
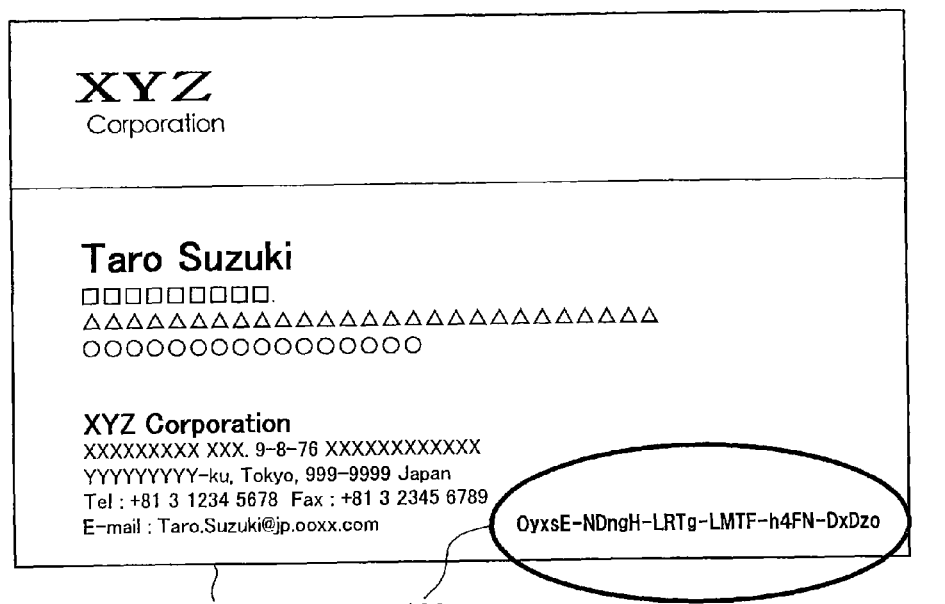
FIG. 12 is a schematic diagram illustrating the case of encoding a 160-bit public key into 27 characters in base64, editing the characters into six chunks of 5-5-4-4-4-5 characters, and printing the edited characters onto a business card.

Meanwhile, FIG. 10 illustrates the case of encoding an 80-bit public key into 14 characters in base64, editing the characters into three chunks of 5-4-5 characters, and printing a public key 102 (m6ULH-DRPp-Gc9m1). In this case, since chunks of five characters exist, eye movement within a chunk may be necessary to recognize a chunk of five characters, and the public key 102 becomes more difficult to remember compared to the display in FIG. 8 or FIG. 9. Also, FIG. 11 illustrates the case of encoding a 160-bit public key into 27 characters in base64, editing the characters into seven chunks of 4-4-4-4-4-4-3 characters, and printing a public key 102 (Oyxs-ENDn-gHLR-TgLM-TFh4-FNDx-Dzo). In this case, eye movement may become necessary to recognize which of the seven chunks is currently being viewed, and remembering becomes more difficult compared to the display in FIG. 8 or FIG. 9. Also, FIG. 12 illustrates the case of encoding a 160-bit public key into 27 characters in base64, editing the characters into six chunks of 5-5-4-4-4-5 characters, and printing a public key 102 (OyxsE-NDngH-LRTg-LMTF-h4FN-DxDzo). Likewise in this case, eye movement may become necessary to recognize which of the six chunks is currently being viewed. In addition, eye movement may also become necessary to recognize characters within a chunk of five characters. Consequently, in order to make a public key 102 easier to remember, it is desirable to set a single chunk to four characters or fewer, and set the total number of chunks to seven or fewer.

In the present embodiment, the total number of chunks is set to seven or fewer, and more particularly, preferably set to four (or five). If the total number of chunks is set to four (or five), and a single chunk is set to four characters, the size of a public key expressible in characters becomes 96 bits (or 120 bits). Although discussed later, only the MQ signature scheme may be able to express a public key of this size. In other schemes such as RSA and ECDSA, a public key size of at least 160 bits may be necessary. Consequently, according to the present embodiment, by using the MQ signature scheme, it is possible to print a public key 102 onto a business card 100 as character information, and in addition, by setting the total number of chunks made up of four characters to four (or five), remembering the public key 102 also becomes easy. In the case of copying the public key 102 on the business card 100 or comparing the public key 102 to another public key, a signature verifier is able to recognize the chunks without eye movement, since the public key 102 is divided every four characters. Also, by setting the total number of chunks to four (or five), it is possible to recognize which chunk is currently being copied or compared to, without eye movement (or alternatively, easy remembrance within the range of short-term memory becomes possible). Consequently, it becomes possible to easily copy a public key 102 stated on a business card 100, or input the public key 102 into another device.

Figure 13:
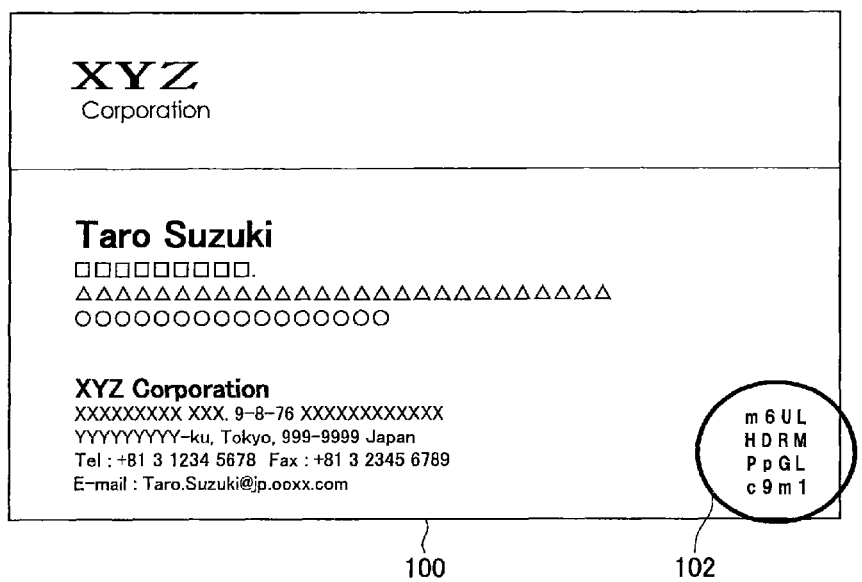
FIG. 13 is a schematic diagram illustrating an example of stating a public key on a business card by encoding the public key into 16 characters in base64, and editing the characters into a 16-character square of 4×4 characters.

FIG. 13 illustrates an example of stating a public key 102 on a business card by encoding the public key into 16 characters in base64 (or 36 alphanumeric characters), and editing the characters into a 16-character square of 4×4 characters. In this way, besides being stated as an ordinary string, a public key 102 may also be stated in a given planar area.

FIG. 14 illustrates the case of encoding a public key 102 in base64 (or 36 alphanumeric characters), and displaying the encoded public key split into a first part PK (first) and a latter part PK (latter). In this way, a public key 102 may also be stated on a business card 100 by being split into multiple parts. With a split display, visibility becomes easy, on the same level as a phone number.

Business cards 100 are frequently exchanged at business scenes and the like, and the design is extremely important. The size of an ordinary business card (Japanese common type 4) is 55 mm by 91 mm, and space is limited. Provided that the margins are 5 mm each, the actual range usable for printing is approximately 45 mm by 81 mm. Consequently, if a public key 102 stated on a business card 100 is made to be shorter than this size (character count), positioning constraints on the business card 100 do not occur. In the case of constructing a public key 102 with 80 bits, encoding in base64 as above yields 14 characters, which becomes 17 characters when divided into individual chunks of four characters with a hyphen (-) inserted between, as illustrated in FIG. 8. Consequently, even with a business card 100 of limited size, a public key 102 may be displayed without suffering design constraints. For this reason, using the MQ signature scheme enables significant refinement in the design of a business card 100.

Generally, a minimum key strength of 80 bits or more may be necessary for electronic signature technology. In the case of the RSA scheme, an 80-bit key strength desires a key size of at least 1024 bits, which becomes 171 characters when encoded in base64. Also, in the case of the ECDSA scheme, having an 80-bit key strength desires a key size of at least 160 bits, which becomes 27 characters when encoded in base64. In this way, with other authentication schemes such as RSA, the public key size is at least 160 bits, and thus encoding in base64 yields 27 characters, which becomes 32 characters when divided into individual chunks of five characters with a hyphen (-) inserted between. Consequently, as illustrated in FIGS. 11 and 12, the printing range of a public key 102 on a business card 100 becomes large, and compares unfavorably with the business card 100 in FIGS. 8 and 9 in terms of design.

On the other hand, with the MQ signature scheme, it is possible to achieve 80-bit key strength with a public key of at least 80 bits. Consequently, by using the MQ signature scheme, it is possible to minimize the size of the public key 102, and express the public key 102 with 14 characters in the case of base64 encoding.

[4-3. Situations in which Business Card According to Present Embodiment is Used]

Next, situations in which a business card 100 according to the present embodiment is used will be described. A public key is information that looks random at first glance, and the public key by itself may be insufficient to check "who the public key belongs to". The infrastructure that guarantees "who the public key belongs to" is the public key infrastructure (PKI), which is currently costly to construct or utilize. By utilizing a business card 100 stating a public key 102 according to the present embodiment, rather than receiving a guarantee of "who the public key belongs to" from a third party such as a PKI, it is possible to directly check "who the public key belongs to" by receiving a business card 100 from the owner of that business card 100. In other words, in the present embodiment, it is possible to directly check that a public key is the public key of the owner of a business card 100 by receiving the business card 100. Particularly, in the present embodiment, a person is able to directly check a public key 102 stated on a business card 100 as character information, without using an additional device such as a QR code reader.

Figure 15:
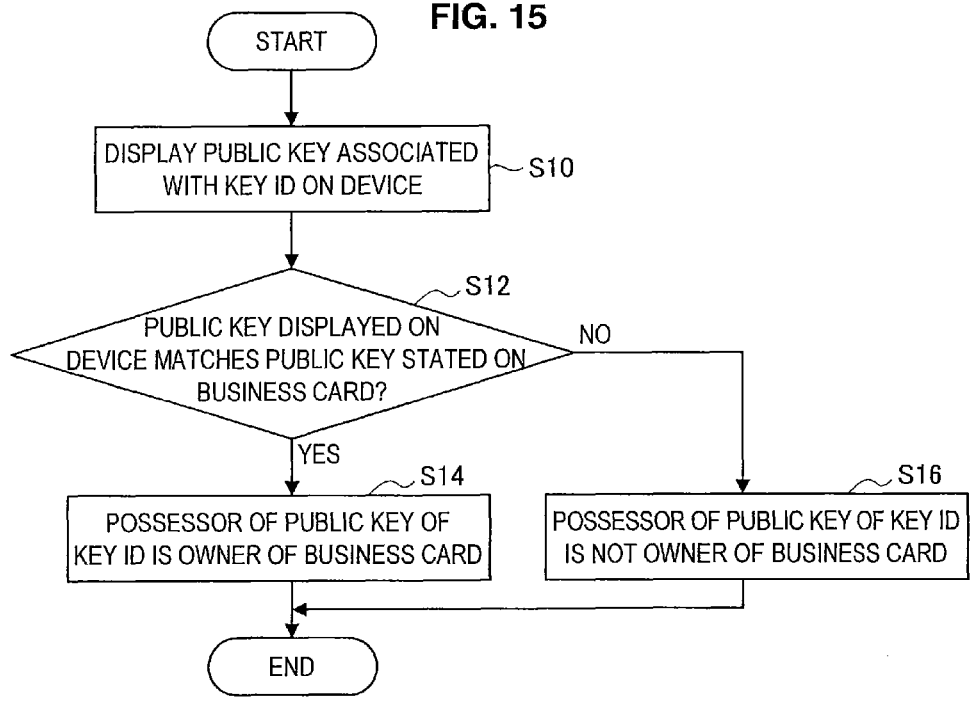
FIG. 15 is a flowchart illustrating a process that checks whether or not a public key stored by a verification device that conducts a signature verification process matches public key information stated on a business card 100.

In this way, the public key 102 stated on a business card 100 has a one-to-one correspondence with the person stated on the business card 100. For this reason, a business card 100 according to the present embodiment may be used to check whether or not a public key 102 stored by a device that conducts an MQ authentication process or an MQ signature verification process matches public key 102 information stated on a business card 100. Note that although the following description takes the verification of an MQ electronic signature as an example, the following is similarly applicable to MQ authentication. FIG. 15 is a flowchart illustrating a process that checks whether or not a public key stored by a verification device 200 that conducts an electronic signature verification process matches public key 102 information stated on a business card 100. First, in step S10, a public key registered in association with a key ID inside the verification device 200 is displayed on a display of the verification device 200. Herein, a key ID is a name set inside the verification device 200 in order to specify a single public key in the case where multiple public keys are registered in the verification device 200. For the key ID, numerals corresponding to public keys (key number 1, 2, . . . ), the name of the possessor of a public key (Taro Suzuki), an email address of the possessor of a public key, or the like may be used. Note that a key ID may also not be set in the case where only one public key is registered in the verification device 200, or in other words, the case where the verification device 200 is a device that conducts signature verification with one specific public key only.

The case where the name of the possessor of a public key (Taro Suzuki) is set as the key ID will now be described. In this case, in step S10, the name of the possessor (Taro Suzuki) and the corresponding public key are displayed on the verification device 200.

In the next step S12, a user visually reads a public key 102 stated on a business card 100, and visually checks whether or not the public key displayed on the verification device 200 matches the public key 102 stated on the business card 100. The process then proceeds to step S14 in the case where the public key displayed on the verification device 200 matches the public key 102 stated on the business card 100, and proceeds to step S16 in the case of a non-match.

In the case of proceeding to step S14, the public key displayed on the verification device 200 matches the public key 102 stated on the business card 100, and thus the possessor of the public key stored by the verification device 200 may be determined to be the owner of the business card 100 stating the public key 102.

On the other hand, in the case of proceeding to step S16, the public key displayed on the verification device 200 does not match the public key 102 stated on the business card 100, and thus the possessor of the public key stored by the verification device 200 may be determined to not be the owner of the business card 100 stating the public key 102.

In this way, by visually comparing a public key 102 stated on a business card 100 to a public key stored by a verification device 200, a user is able to easily judge whether or not the possessor of the public key stored by the verification device 200 is the owner of the business card 100.

With a similar technique, in the case where an arbitrary user has published a public key on a network, such as on a social networking service, for example, by comparing the public key published on the network to a public key 102 stated on a business card 100, it is possible to easily judge whether or not the user publishing the public key on the network is the owner of the business card 100. In this case, if the public key published by the arbitrary user on the social networking service matches the public key 102 stated on the business card 100, that user may be judged to be the owner of the business card 100.

In addition, a business card 100 according to the present embodiment may be used in the case of inputting public key 102 information stated on the business card 100 into a verification device 200 that conducts an electronic signature verification process. In the case of conducting an electronic signature verification process according to the MQ protocol discussed earlier, public key information is acquired in advance on the side of the verification device 200 that conducts verification. In this case, by inputting as-is a public key 102 stated on a business card 100 into the verification device 200, the verification device 200 is able to acquire public key 102 information.

Figure 16:
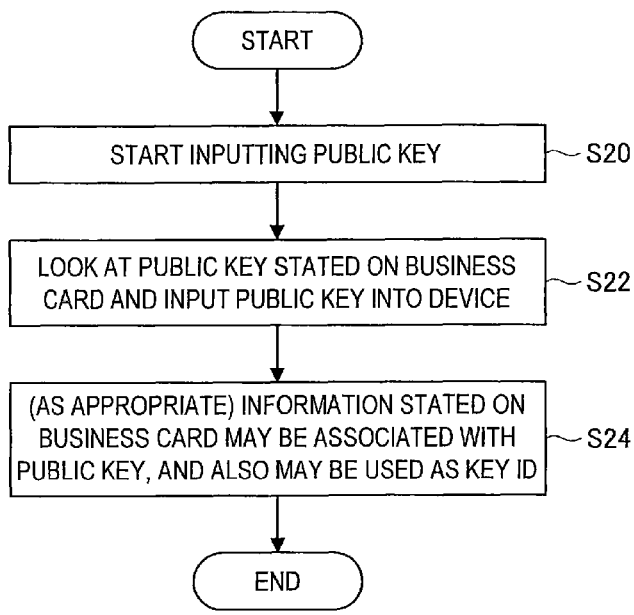
FIG. 16 is a flowchart illustrating a process that inputs a public key into a verification device.

FIG. 16 is a flowchart illustrating a process that inputs a public key 102 into a verification device 200. First, in step S20, a user starts a public key input process. In the next step S22, the user views a public key 102 stated on a business card 100, and inputs as-is the characters of the public key 102 into the verification device 200. In the next step S24, the public key 102 is associated with information such as a name, phone number, and email address stated on the business card 100. In this case, the associated name or other information may be used as the key ID described using FIG. 15. The verification device 200 decodes and uses the input public key 102 in an electronic signature verification process. Note that the processing in step S24 may also not be conducted if not particularly necessary.

As above, according to a business card 100 in accordance with the present embodiment, a public key 102 may be stated as a string, and thus a user receiving the business card 100 from the owner of the business card 100 is able to visually check the public key 102 string. Consequently, the user receiving the business card 100 is able to easily and visually determine whether or not a public key already being stored by a verification device 200 that conducts electronic signature verification matches the public key 102 stated on the business card 100. Also, the user receiving the business card 100 is able to visually read and input the public key 102 stated on the business card 100 into the verification device 200. The verification device 200 is able to decode and use the input public key 102 in a verification process in the case of an electronic signature verification request from the owner of the business card 100.

[4-4. Exemplary Configuration of System According to Present Embodiment]

Figure 17:
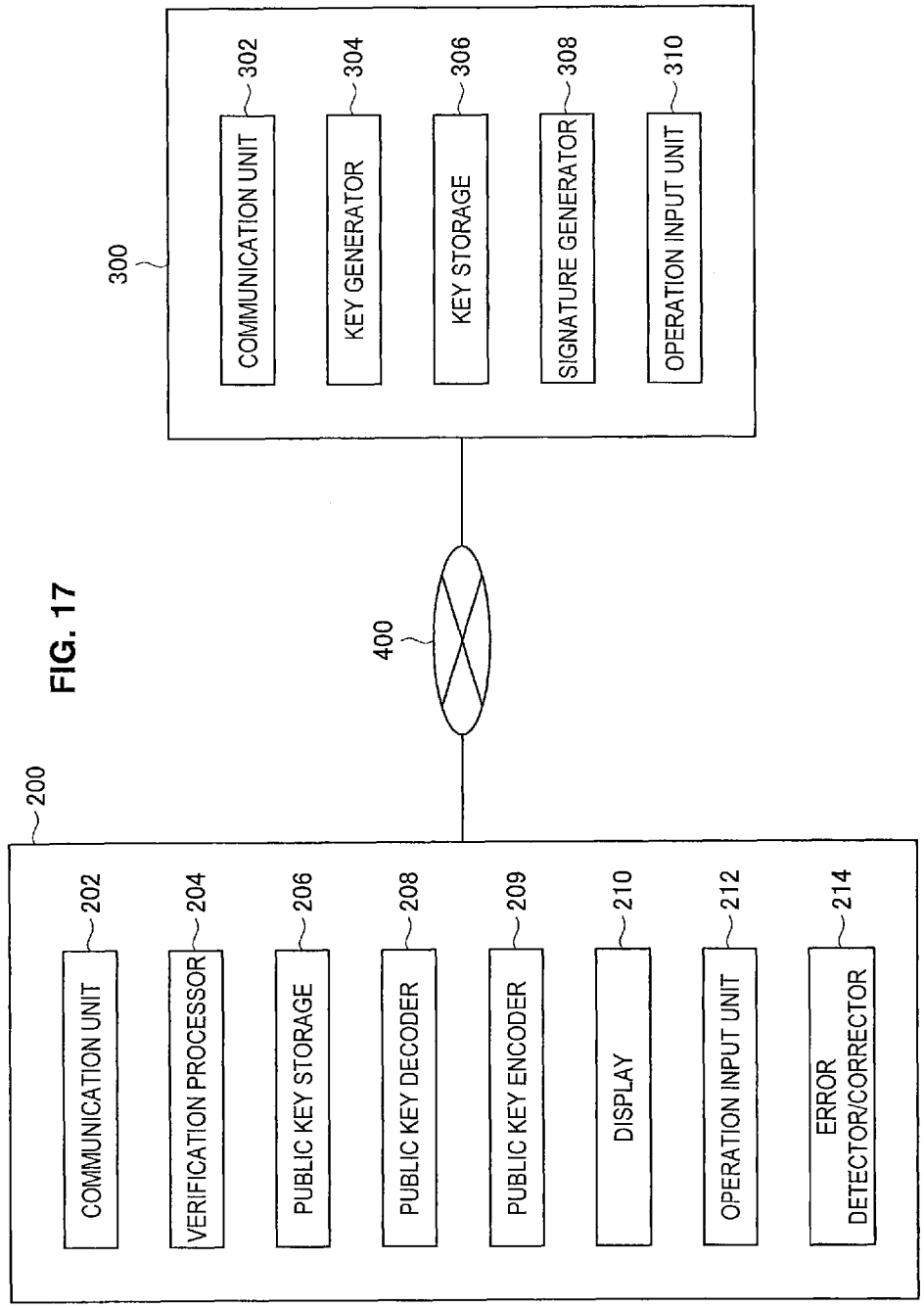
FIG. 17 is a schematic diagram illustrating a configuration of a system made up of a verification device and a client terminal.

Next, an exemplary configuration of a system according to the present embodiment will be described. FIG. 17 is a schematic diagram illustrating a configuration of a system made up of a verification device 200 and a client terminal 300. First, a configuration of a verification device 200 according to the present embodiment will be described. The verification device 200 includes a communication unit 202, a verification processor 204, public key storage 206, a public key decoder 208, a public key encoder 209, a display 210, and an operation input unit 212. The verification device 200 is connected via a network 400 to a client terminal 300 that issues an electronic signature verification request.

The communication unit 202 communicates with the client terminal 300 that issues a verification request, and receives the verification request from the client terminal 300. Herein, the client terminal 300 may also be a device possessed by the owner of the business card 100.

In the case where there is a verification request for an electronic signature from the client terminal 300, the verification processor 204 uses a public key to verify the electronic signature σ. Specifically, the verification processor 204 conducts a process that includes operation #4 in FIG. 6.

The public key storage 206 holds (stores) a public key. The operation input unit 212 is an input unit that input public key information due to being operated by a user. As discussed above, from the operation input unit 212, a user is able to input the string of a public key 102 stated on a business card 100 received from the owner of the business card 100. The public key decoder 208 decodes a public key 102 input by the operation input unit 212. Since public key 102 information input by the operation input unit 212 is character information encoding a public key, the public key decoder 208 generates binary data of the public key by decoding the character information of the public key 102. The public key storage 206 stores public key information. The public key storage 206 stores binary data decoded from a character information public key 102, but may also store the character information of a public key 102 prior to decoding. In the case where the public key storage 206 stores multiple public keys, the public key storage 206 stores the public keys in association with key IDs.

The display 210 displays public key information being stored in the public key storage 206. In the case where a public key stored in the public key storage 206 is unencoded data, the public key encoder 209 uses base64 to encode the data into character information. The display 210 displays the character information of an encoded public key. Thus, a user is able to visually judge whether or not a public key 102 stated on a business card 100 matches a public key being stored by the public key storage 206.

Next, a configuration of the client terminal 300 will be described. The client terminal 300 includes a communication unit 302, a key generator 304, key storage 306, a signature generator 308, and an operation input unit 310. The key generator 304 generates a public key and secret key pair. Specifically, the key generator 304 conducts a process that includes operation #1 in FIG. 6. The key storage 306 is memory that stores a public key and a secret key generated by the key generator 304. Note that a public key and secret key pair may also be generated by an external device and stored in the key storage 306. The signature generator 308 conducts operations #2 and #3 in FIG. 6, and generates an electronic signature σ. The communication unit 302 transmits the electronic signature σ to the verification device 200 via the network 400. The operation input unit 310 includes structural elements such as a touch sensor and a keyboard that a user operates in order to input information.

If the user of the client terminal 300 (herein taken to be the owner of the business card 100) inputs a verification request for an electronic signature σ into the operation input unit 310, the communication unit 302 transmits the electronic signature σ to the verification device 200.

Note that the respective structural elements of the verification device 200 and the client terminal 300 illustrated in FIG. 17 may be realized by hardware (circuits), or by a program (software) causing a processor such as a CPU to function as the structural elements. In this case, the program may be stored on a memory medium, such as memory provided in the verification device 200 or the client terminal 300, or externally connected memory.

[4-5. Process of Creating a Business Card]

Figure 18:
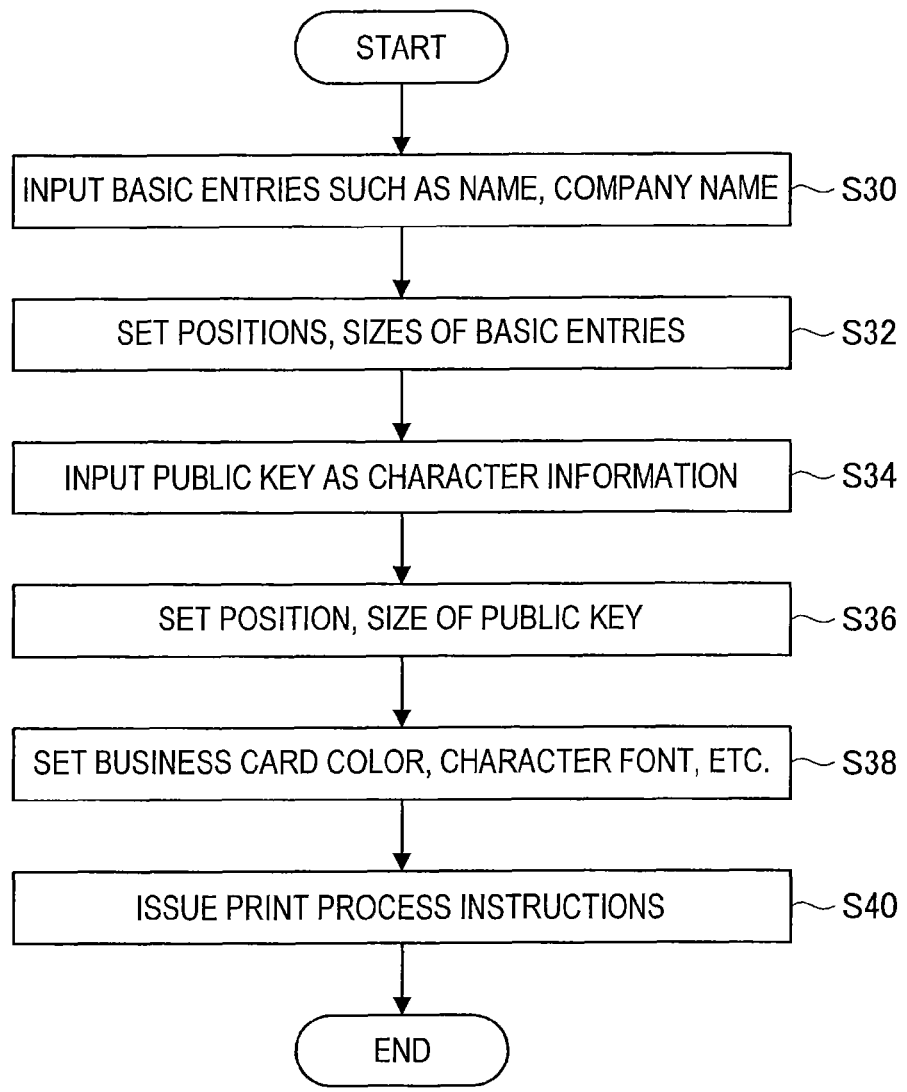
FIG. 18 is a flowchart illustrating a process that creates a business card.

Next, a process for creating a business card 100 will be described. FIG. 18 is a flowchart illustrating a process of creating a business card 100, and illustrates a process conducted by a computer such as a personal computer. The computer transmits information set by a user according to the process in FIG. 18 to a printer, and the printer prints a business card. Also, a program for executing the process in FIG. 18 is stored in a memory medium such as memory provided in the computer. The computer executes the process in FIG. 18 using a processor such as a CPU, and the program, which causes the processor to function.

First, in step S30, a user creating a business card 100 (herein taken to be the owner of the business card 100 as discussed above) inputs basic entries into a computer, such as a name, company name, company address, phone number, fax number, and email address to be stated on the business card 100. In the next step S32, on the basis of the user's input, the positions and sizes of the basic entries input in step S30 on the business card 100 are set.

In the next step S34, the user inputs a public key 102 as character information. In the next step S36, on the basis of the user's input, the position and size of the public key 102 input in step S34 on the business card 100 is set. Also, in the case of stating the public key 102 on the business card 100 by editing the public key 102 into a 16-character square of 4×4 characters or the like as in FIG. 13, or in the case of stating the public key 102 on the business card 100 by splitting the public key 102 as in FIG. 14, settings are configured in step S36. In the next step S38, on the basis of the user's input, the color, font, and the like of the business card 100 are set.

In the next step S40, on the basis of the user's input, print process instructions are issued. Thus, the content set in steps S30 to S38 is sent to the printer, and the printer prints the business card 100. After step S40, the process ends. As above, according to the process in FIG. 18, creating a business card 100 with a public key 102 printed thereupon becomes possible.

[4-6. Example of Adding Error-Detecting Code or Error-Correcting Code to Public Key]

Next, an example of adding an error-detecting code or error-correcting code to a public key will be described. Consider the case where, besides mistakenly recognizing a public key 102, a user makes an input error when inputting the public key 102 into a device such as the verification device 200. In order to detect such an input error, the public key 102 stated on a business card 100 is encoded with an error-detecting code or an error-correcting code, and expressed in base64. For example, as an example of a simple error-detecting code, a checksum may be added to the public key 102. In the example of an 8-bit checksum, 80 bits are treated as ten 8-bit integers, and the ten 8-bit integers are added together to create an 8-bit integer, which is taken to be the checksum. However, since there are constraints on the space on the business card 100, it is desirable to not conduct encoding that exceeds 16 characters (up to 20 characters) when expressed in base64.

Thus, when a user inputs a public key 102 into a device such as the verification device 200, an error in the public key 102 input by the user may be detected by utilizing an error-detecting code. In the case of utilizing an error-correcting code, an input error may be automatically corrected. Consequently, it is possible to reliably inhibit the occurrence of input errors. The detection and correction of input errors is conducted by the error detector/corrector 214 of the verification device 200.

[4-7. Encoding Methods Other than Base64]

Although the above-discussed example describes an example of encoding a public key in base64, some other character set may be utilized to express an 80-bit public key 102. For example, it is also possible to utilize only 26 alphabetic characters and 10 numeral characters, for a total of 36 characters. In this case, 80-bit information is sufficiently expressible in 16 characters, as in the following examples.

Ex. 1) A08G-5JMW-RL2C-98UT

Ex. 2) a08g-5jmw-rl2c-98ut

Furthermore, in situations where distinguishing 0 (zero) and O ("oh") is difficult, it is also possible to utilize only 35 characters excluding zero, for example. Furthermore, it is possible to configure settings so as to not use one of other hard-to-distinguish characters, such as 9 and q. In such cases, 80-bit information is still sufficiently expressible in 16 characters if the character set has 32 or more characters.

Additionally, it is possible to utilize a character set from the 2,136 Joyo kanji characters, excluding characters with negative connotations. With a character set of 2,136 characters, 80-bit information is expressible in 8 characters, as in the following example.

Ex. 3)

楽各次岡一景士察戻

The case of utilizing other character sets, such as Arabic characters, is similar. Consequently, a public key may be displayed in the same language as the name and company name stated on a business card. In the case where the written language differs on the front and back sides of a business card 100, the language of the front and back public keys may also be made to differ according to language.

The character information of a public key 102 may include information related to a scheme for decoding the character information. In this case, the public key decoder 208 is able to decode the public key 102 on the basis of the information related to a scheme for decoding the character information.

According to the present embodiment as described above, a public key 102 that is visually recognizable may be displayed on a business card 100. Consequently, by passing out the business card 100, the owner of the business card 100 becomes able to distribute a public key 102 that is visually recognizable to a user receiving the business card 100. Thus, a user receiving the business card 100 becomes able to make a visual comparison against another, arbitrarily acquired public key on the basis of the public key 102 stated on the business card 100, and is able to easily judge whether or not a public key set in a device such as a verification device 200, a public key published on a network, or the like is the public key 102 of the owner of the business card 100. Also, the user receiving the business card 100 becomes able to visually read and input the public key 102 printed on the business card 100 into a device such as the verification device 200.

The foregoing thus describes preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A print medium, whereon a public key used for authentication in a public-key authentication scheme is displayed as character information.

(2) The print medium according to (1), wherein the public-key authentication scheme corresponds to an MQ authentication scheme, and the character information of the public key is information in which information with 80 bits or fewer is encoded.

(3) The print medium according to claim 2, wherein the character information of the public key is divided into multiple chunks, and a single chunk includes four characters or fewer.

(4) The print medium according to (2), wherein the character information of the public key is divided into seven chunks or fewer.

(5) The print medium according to any one of (1) to (4), wherein the character information of the public key includes information related to error detection or error correction.

(6) The print medium according to any one of (1) to (5), wherein the character information of the public key includes information related to a scheme for decoding character information.

(7) The print medium according to any one of (1) to (6), wherein the character information of the public key is used in order to be input into a verification device that conducts verification according to a public-key authentication scheme.

(8) The print medium according to any one of (1) to (6), wherein the character information of the public key is used in judging a match with a public key registered in a verification device that conducts verification in a public-key authentication scheme.

(9) The print medium according to any one of (1) to (6), wherein the character information of the public key is used in judging a match with a public key published by a given user via a network.

(10) The print medium according to any one of (1) to (9), wherein the print medium includes information related to an owner's name, and is used as a business card.

(11) A card creation method including:

receiving input of a basic entry to be stated on a card;

receiving a public key used for authentication in a public-key authentication scheme as input to be stated on a card as character information; and issuing an instruction to print a card including the basic entry and the character information of the public key.

(12) A program causing a computer to function as:

an input receiver that receives input of a basic entry to be stated on a card;

a public key receiver that receives a public key used for authentication in a public-key authentication scheme as input to be stated on a card as character information; and a print instruction unit that issues an instruction to print a card including the basic entry and the character information of the public key.

What is claimed is:

1. An authentication system comprising:
   circuitry configured to:
      encode a public key used for authentication in a public-key authentication scheme to obtain first character information, the first character information being a first array of a plurality of characters, the first character information including information related to error correction and information related to a scheme for decoding the first character information;
      print a print medium, whereon the first array of the plurality of characters is displayed;
      receive second character information, the second character information being a second array of a plurality of characters;
      correct an error in the second character information using the information related to error correction when the error exists in the second character information;
      decode the second character information using the scheme for decoding the first character information based on the information related to the scheme for decoding the first character information; and conduct verification using the decoded second character information according to the public-key authentication scheme.

2. The authentication system according to claim 1, wherein the second character information is information which is input by a user based on the first array of the plurality of characters displayed on the print medium.

3. The authentication system according to claim 1, wherein the public-key authentication scheme is a MQ authentication scheme, and the first character information of the public key is information in which information with 80 bits or fewer is encoded.

4. The authentication system according to claim 3, wherein the first array of the plurality of characters is composed of multiple chunks, a single chunk of the multiple chunks including four characters or fewer.

5. The authentication system according to claim 3, wherein the first array of the plurality of characters is composed of seven chunks or fewer.

6. The authentication system according to claim 1, wherein the print medium includes information related to an owner's name.

7. The authentication system according to claim 1, wherein the circuitry is configured to conduct the verification by matching the decoded second character information with the public key.

8. The authentication system according to claim 7, wherein the public key is registered in the circuitry.

9. The authentication system according to claim 7, wherein the public key is published by a given user via a network.

10. A method of authentication comprising:
   encoding, using circuitry, a public key used for authentication in a public-key authentication scheme to obtain first character information, the first character information being a first array of a plurality of characters, the first character information including information related to error correction and information related to a scheme for decoding the first character information;
   printing a print medium, whereon the first array of the plurality of characters is displayed;
   receiving second character information, the second character information being a second array of a plurality of characters;
   correcting an error in the second character information using the information related to error correction when the error exists in the second character information;
   decoding the second character information using the scheme for decoding the first character information based on the information related to the scheme for decoding the first character information; and
   conducting verification using the decoded second character information according to the public-key authentication scheme.

11. A non-transitory computer readable medium including executable instructions, which when executed by a computer cause the computer to:
   encode a public key used for authentication in a public-key authentication scheme to obtain first character information, the first character information being a first array of a plurality of characters, the first character information including information related to error correction and information related to a scheme for decoding the first character information;
   print a print medium, whereon the first array of the plurality of characters is displayed;
   receive second character information, the second character information being a second array of a plurality of characters;
   correct an error in the second character information using the information related to error correction when the error exists in the second character information;
   decode the second character information using the scheme for decoding the first character information based on the information related to the scheme for decoding the first character information; and
   conduct verification using the decoded second character information according to the public-key authentication scheme.

* * * * *